United States Patent [19]
Kassouf et al.

[11] Patent Number: 5,250,190
[45] Date of Patent: * Oct. 5, 1993

[54] ON-LINE BLENDING METHOD FOR ACTIVATOR CATALYZED PAINT DETACKIFICATION PROGRAM

[75] Inventors: Mitchell J. Kassouf, Lansdale; Daniel W. Yankovich, Jr., Richboro; Deborah L. Purnell, Philadephia, all of Pa.

[73] Assignee: Betz Laboratories, Inc., Trevose, Pa.

[*] Notice: The portion of the term of this patent subsequent to Sep. 15, 2009 has been disclaimed.

[21] Appl. No.: 895,765

[22] Filed: Jun. 9, 1992

Related U.S. Application Data

[63] Continuation-in-part of Ser. No. 751,945, Aug. 29, 1991, Pat. No. 5,147,558, which is a continuation-in-part of Ser. No. 590,910, Oct. 1, 1990, abandoned, which is a continuation-in-part of Ser. No. 388,435, Aug. 2, 1989, abandoned, which is a continuation-in-part of Ser. No. 327,846, Mar. 23, 1989, abandoned, which is a continuation-in-part of Ser. No. 161,866, Feb. 29, 1988, Pat. No. 4,853,132.

[51] Int. Cl.$^5$ ............................................. C02F 1/56
[52] U.S. Cl. .................................. 210/712; 210/728; 210/930; 252/181; 95/197
[58] Field of Search .............. 55/85; 134/38; 210/702, 210/712, 723–728, 735, 736, 930; 252/180, 181; 427/331

[56] References Cited

U.S. PATENT DOCUMENTS

| | | | |
|---|---|---|---|
| 3,515,575 | 6/1970 | Arnold | 117/102 |
| 3,990,869 | 11/1976 | Forney | 55/19 |
| 4,067,806 | 1/1978 | Mauceri | 210/52 |
| 4,185,976 | 1/1980 | Dean | 55/89 |
| 4,220,456 | 9/1980 | Block | 55/85 |
| 4,440,647 | 4/1984 | Puchalski | 210/712 |
| 4,504,395 | 3/1985 | Harpel et al. | 210/712 |
| 4,564,464 | 1/1986 | Harpel et al. | 252/181 |
| 4,629,572 | 12/1986 | Leitz et al. | 210/714 |
| 4,637,824 | 1/1987 | Pominville | 210/728 |
| 4,656,059 | 4/1987 | Mizuno et al. | 427/345 |
| 4,686,047 | 8/1987 | Arots | 210/712 |
| 4,853,132 | 8/1989 | Merrell et al. | 210/728 |
| 5,015,391 | 5/1991 | Mohn | 210/736 |
| 5,024,768 | 6/1991 | Merrell | 210/728 |
| 5,060,682 | 10/1991 | Merrell | 210/736 |
| 5,147,557 | 9/1992 | Purnell | 210/728 |
| 5,147,558 | 9/1992 | Purnell | 210/728 |

*Primary Examiner*—Peter Hruskoci
*Attorney, Agent, or Firm*—Alexander D. Ricci; Steven D. Boyd

[57] ABSTRACT

In a paint spray booth wherein water is used to collect oversprayed paint, a process for detackifying and coagulating the oversprayed paint by the addition of specific amounts of specific anions and cationic polymers blended prior to addition to the water system.

1 Claim, No Drawings

ON-LINE BLENDING METHOD FOR ACTIVATOR CATALYZED PAINT DETACKIFICATION PROGRAM

This is a continuation-in-part of Ser. No. 07/751,945 filed on Aug. 29, 1991, now U.S. Pat. No. 5,147,558 which is a continuation-in-part of Ser. No. 590,910 filed Oct. 1, 1990, which is a continuation-in-part of Ser. No. 07/388,435, filed Aug. 2, 1989 which is a continuation-in-part of Ser. No. 07/327,846 filed Mar. 23, 1989 (now abandoned), which is a continuation-in-part of Ser. No. 07/161,866, filed Feb. 29, 1988, now U.S. Pat. No. 4,853,132.

FIELD OF THE INVENTION

This invention relates to an improved method for treating paint wastes and paint oversprays encountered in wet paint spray booths or any areas where these oversprays exist. More particularly the present invention relates to an improved method for treating wastes and oversprays in paint spray booths where the precipitate formed by the combination of certain inorganic anions and cationic polymers is employed to detackify paint.

BACKGROUND OF THE INVENTION

The spray painting of automobile bodies, truck engines, appliances, and other industrial goods is customarily carried out in enclosed areas called paint spray booths (PSB). These booths act to contain any fumes or oversprayed paint, to reduce the chances of airborne contamination and to protect the painters from these hazards. These booths vary in size, but are somewhat basic in their design and operation. A typical booth would thus consist of a work area, back section with mist eliminators and a sump.

The units to be painted generally pass through the work area while an air flow makes the oversprayed paint contact either the sump water or the spray from a water curtain. The air is scrubbed with recirculated water at the water curtain, passes through mist eliminators and is removed by an exhaust fan.

Even though paint transfer efficiencies have increased through improved application technologies, roughly one-half of all paint sprayed does not reach its intended article. As a result, a significant concentration of paint builds up in the system and agglomeration can occur. The resultant mass is a sticky, tacky material, which can plug the mist eliminators, shower heads, and even recirculating pumps. When this happens, scrubbing efficiency decreases, leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungi proliferation, which conditions generate corrosion and odor problems. In addition, the paint solids that are recirculated can form suspensions in the water. They remain tacky and can create expensive separation and disposal problems.

These problems show, therefore, the desirability to treat PSB water systems so as to reduce or prevent as much as possible the agglomeration and deposition of oversprayed paint on critical PSB operation parts, to render the resultant sludge non-tacky and easily removable and to provide a water quality such that it can be recycled for use in the system.

Another problem associated with paint detackification and separation from the paint spray booth water wash system is the disposal cost associated with removal of the resulting paint sludge. For economic reasons, it is highly desirable to provide a PSB chemical treatment that results in a high solids (low moisture) sludge with a reduced or low volume sludge so that disposal costs may accordingly be minimized.

RELEVANT ART

Many and varied chemical treatments have been proposed for detackifying the paint and providing a manageable sludge. For instance, in U.S. Pat. No. 3,515,575 (Arnold), it is suggested that the addition of at least 0.5 ppm of a water soluble polymer having repeat groups with the formula:

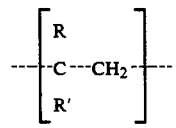

R=a hydrogen or methyl group, R'=an amide or carboxyl group is effective at deactivating and collecting overspray paints. The polymer is added to a paint spray booth wash water containing alkali, wetting agents, absorbents, and defoaming agents.

This treatment approach was simplified in subsequent teachings. Examples include U.S. Pat. Nos. 3,990,869 (Forney), U.S. Pat. No. 4,067,806 (Mauceri), and U.S. Pat. No. 4,440,647 (Puchalski). These patents discuss the use of a variety of cationic polymers in conjunction with amphoteric metal salts and pH adjustment.

U.S. Pat. No. 4,686,047 (Arots) describes a cationic polymer treatment that does not require the use of amphoteric metal salts or other additives to achieve high performance and efficacy, as long as the pH is maintained above at least 6. Arots demonstrates the technique with polymer levels of 4-40%, based on overspray paint, at pH's adjusted to 10.

Similarly, U.S. Pat. No. 4,656,059 (Mizuno et al.) uses a colloidal solution of a melamine-aldehyde resin with pH adjustment to provide detackification. Other additives are suggested for improving the performance of the detackifier and for paint sludge handling (surface active agent for improving paint dispersibility and emulsifiability and a flocculant for improving solid-liquid separating properties). The treatment levels used in the examples are 0.1–5%, based on overspray paint.

As an improvement on Mizuno, U.S. Pat. No. 4,629,572 (Leitz et al.) incorporates the use of a water-swellable clay with colloidal solutions of urea or an amino triazine (melamine) aldehyde resin. Other patents which may be of interest include U.S. Pat. Nos. 4,185,970 (Dean), U.S. Pat. No. 4,220,456 (Block), U.S. Pat. No. 4,504,395 (Harpel et al.,), and U.S. Pat. No. 4,564,464 (Harpel et al.).

GENERAL DESCRIPTION OF THE INVENTION

The above and other problems in the field of paint spray booth chemical treatments are addressed by the present invention. An improved method of feeding a combination of an inorganic anionic activator with a cationic polymer is provided. The combination is effective at detackifying and coagulating paint, lacquer, or enamel in paint spray booths in which water is used to wash air inside the booths. More particularly, the present invention comprises an improved process for detackifying and coagulating the paint, lacquer or enamel in paint spray booths in which water is used to wash air in the booth and to remove oversprayed paints, enamels, or lacquers and wherein said water is recirculated for further washing the air in the paint spray booth. The process of the present invention comprises diluting a concentrate of a cationic polymer or blends of cationic polymers with water, mixing, subsequently adding a concentrate of an anionic activator followed by mixing. The resulting treatment solution is added to the paint spray booth water to detackify and coagulate the paint, lacquer, or enamel in order to provide a paint sludge that is high in solids and low in volume.

It was discovered that the successive addition and mixing of concentrates of the cationic polymer or polymer blends and the inorganic anionic activator to a water stream prior to feed to the paint spray booth water system provided improved paint, lacquer, or enamel detackification. It is believed that the successive addition and mixing of the present invention allows for reaction between the cationic polymer and the anionic activator to proceed free from interference from materials present in the paint spray booth water system. Further, the successive addition and mixing of the concentrates of the cationic polymer and anionic activator allow for rapid and easy adjustments in polymer to activator ratio. Changes in polymer to activator ratio may be desirable to control system upsets, changes in paint, or changes in other chemicals added to the paint spray booth system. The efficacy of the present process allows for a decrease in polymer and activator feed while providing improved detackification.

The successive addition and mixing of the polymer and activator to a water stream prior to feed to the paint spray booth water system allows for accurate control of the polymer to activator ratio. Control of the polymer to activator ratio is important to avoid the formation of an undesirable, fine floc at low concentrations of polymer and activator or the formation of a gel at high concentrations of polymer and activator.

DETAILED DESCRIPTION OF THE INVENTION

The present invention provides an improved paint spray booth detackification program which effectively detackifies paint, provides a paint sludge that is high in solids and of low volume, which program is easily controlled.

In accordance with the present invention, it has been discovered that a paint spray booth treatment which comprises the use of specific inorganic anion activators in conjunction with cationic polymers is improved by the successive feeding and mixing of concentrates of the anion activator and the cationic polymers in an aqueous stream prior to feed to the water system of a paint spray booth.

It has been disclosed in U.S. Pat. No. 4,853,132, hereby incorporated by reference, that the use of specific inorganic anions, such as silicates, when combined with cationic polymers provides an improved composition and method for the detackification of paint wastes in a paint spray booth environment. According to this system, a selected inorganic anion and a cationic polymer are separately added to the recirculating wash water in the spray booth. In the water, the anion "activates" the polymer to form a precipitate which is responsible for detackification of the paint particles. Upon detackification, the anion is released from the cationic polymer, thereupon making it available for further activation of additional cationic polymers.

The anion is not consumed in the detackification process. However, other avenues of anion loss exist. These include loss with water removed from the system in the wet sludge, loss through reaction and precipitation with water hardness cations such as calcium and magnesium and loss with system blowdown or drift out the exhaust. These losses can be predicted and partially controlled.

In the commercialization of this technology, when silicate is used as the anion an unexpected high rate of silicate loss is experienced. This is caused by pH suppression resulting from $CO_2$ adsorption during aeration of the wash water. The solubility of silicate is strongly dependent on the pH of the solution. It is believed that an effective silicate can be formed by adding silica in another form (such as colloidal silica) and then raising the pH with additions of caustic or other alkaline materials. At typical use concentrations the solution is buffered by the silica to a pH of about 10.3. As the pH of the solution decreases, the concentration of silicate drops due to a corresponding reduction in the solubility of silica.

The process of the present invention allows the practitioner to calculate these anion losses and adjust the anion/cationic polymer blend ratio accordingly to maintain uniform anion levels throughout the treatment cycle. Flexibility of the blend ratio and consistency of the treatment product are key benefits of the invention. For example, if anion losses are calculated to be high, the practitioner may easily alter the anion feed rate.

Contemporary treatment programs require the separate addition of the anion and the cationic polymer into the spray booth wash water. Since a precipitate is formed upon the interaction of the anion and cationic polymer, these two species must therefore be fed independently. If combined prior to system feed, conventional wisdom holds that the precipitate would agglomerate to form a large, highly viscous mass, rendering the precipitate unmanageable and thereby making feeding it into the wash water nearly impossible. This would therefore have mitigated against preblending the anion and cationic polymer prior to system feed.

It is thought that the primary benefit of this program is that a novel chemical specie is formed, the thermodynamics (i.e., Gibbs free energy of formation) of which favors the reaction with live paint. This novel compound also precludes unreacted or "free" silica and polymer from reacting with extraneous materials in the PSB system such as water hardness and other chemical impurities. This, in turn, will adversely affect paint detackification and sludge handling.

In accordance with the present invention, it has been unexpectedly discovered that the successive addition and mixing of certain anions with specific cationic polymers prior to addition to the wash water of the spray booth results in a stable more effective formulation. The anion and the cationic polymer are blended in a easily varied ratio sufficient to provide optimum paint detackification from the resulting activated stable formulation.

In the prior art, the addition of the treatment chemicals separately to the wash water generates other problems. Under the PSB systems treated by the various conventional programs, it is often necessary to feed the separate components at specific ratios to achieve desired results. For example, some systems require the immediate floatation of the detackified paint. Other systems, however, require that the sludge remain dispersed until it reaches a sludge separation unit. The dispersion or separation properties of the sludge are affected by variations in the ratio of anion to cationic polymer. It is an object of this invention to provide a method of applying a paint detackification composition which is an easily varied blend of anion activator and cationic polymer. The blended treatment program encompassed by the present invention alleviates the problem of one or the other component being improperly fed causing an upset in the blend ratio and allows the blend ratio to be easily varied "on-line".

Water soluble salts of the following anions, in particular the sodium, potassium and ammonium salts thereof, have been found to be particularly effective according to the present invention in providing the desired detackification and sludge conditioning results:

Metasilicate - $SiO_3^{2-}$
Orthosilicate - $SiO_4^{4-}$
Disilicate - $Si_2O_5^{-2}$
Mixed Silicates - $Na_2O \cdot xSiO_2$ (where $x=3-5$)
Metaaluminate - $AlO_2^-$
Aluminosilicates - $Na_2O \cdot xAl_2O_3 \cdot ySiO_2$ (where $x+y=3-5$)
Molybdates - $MO_7O_{24}^{-6}$
Phosphomolybdate - $(PO_4)2 \cdot 12MoO_3^{6-}$
Phosphates - $PO_4^{3-}$, $P_2O_7^{4-}$ The active water soluble cationic polymers of the present invention may be described as being of medium to low molecular weight, as having a high charge density, cross-linked or linear, condensation or addition polymers. The molecular weight range active in this invention may be between about 1,000 and 600,000 average molecular weight. The key criterion, however, is that the polymer is water soluble. The charge densities, as determined by the PVSK Colloid Titration Method (H. Terayama, Kayaku no Kenkya, Vol. 1, p. 75, 1948; H. Terayama, Kayakuno Kenkya, Vol. 4, p. 31, 1949; R. Senju, "Koroido Tekiteiho", Nankodo, Tokyo, 1969), are active in the range of about 1.5 to 12. meq/g active polymer.

The following polymers, and blends thereof have demonstrated the desired performance characteristics:

| Polymer | Description |
|---------|-------------|
| I | Polydiallyl dimethyl ammonium chloride, such as CPS Chemical Company's Ageflex. |
| II | Condensation product of dimethylamine plus epichlorohydrin plus ethylene diamine, such as American Cyanamide Magnifloc 581C. |
| III | Condensation product of dimethylamine plus epichlorohydrin, such as described in U.S. Pat. No. 3,738,945 (Panzer & Dixson). |

The blend of the cationic polymer and the anion do not precipitate or form a gel prior to addition to the PSB water system to be treated; they must remain in solution. The amount of water that may be required to make up the blend of the invention may vary, but it will preferably be between 1 and 60% by weight. The amount of cationic polymer and anion necessary to avoid premature precipitation or gel formation will vary. The acceptable ranges are easily determined by routine testing. The ratio and concentration can be easily adjusted "on-line" by the process of the present invention.

The blend consists of a cationic polymer and an anion in an aqueous solution. The cationic polymer is defined as comprising at least one of the cationic polymers shown above or blends thereof. The ratio of an anion to cationic polymer will depend on characteristics such as the charge of the target paint, the amount of paint in the PSB water system and the predicted loss of the anion due to the factors described above. Generally, the ratio of anion:cationic polymer will be from about 0.25:10 to about 10:1, by weight. The preferred range, however, is from 0.25:1 to 5:1.

Once the appropriate ratio of additives is established by concentrate feed rates it is ready to be added to the PSB water system. Addition is most often made to the water at the location of the sump. However, other locations throughout the recirculating water system may prove to be more desirable, depending on the design of the PSB water system. When treating any water system, it is often necessary to charge the system with an initial dosage of treatment chemicals. An initial charge of the blend of the present invention may fall in the range of about 200 to 5000 ppm, based on weight.

As previously mentioned, the system to be treated may contain features or exhibit factors which would account for anionic loss. Accordingly, it would be necessary to supply more anionic species to the water in such systems. Such an objective may be easily achieved by varying the anionic concentrate species feed rate.

The dosage range of the anion may be from 0-3000 ppm by weight of the treatment solution. The anion may be supplied as a concentrate to reduce shipping costs. The amount of the blend required is dependent upon the amount of paint present in the system. Therefore, the blend is continuously fed as a percent, by weight, based on paint, conventionally known in the art as BOP. The continuous charge of the blend is preferably in the range of 0.1-60% BOP, by weight. The advantage of the present invention is that a varying ratio of anion to cationic polymer can be easily fed to the system from two concentrates which eliminate the preparation, storage and transportation of a variety of blends.

In the practice of the present invention it is not necessary to determine a single blend ratio of anion to cationic polymer. The anion/cationic polymer pairing determined to be efficacious for paint detackification can be easily varied "on-line".

EXAMPLE

A trial was run at a commercial automobile manufacturing paint spray booth. The trial compared the results of the prior art independent addition of cationic polymer and anionic activator and the sequential premixing process of the present invention. Table 1 summarizes the results which shows a significant improvement when the process of the present invention is employed even when the treatment rate was significantly reduced. The cationic polymer employed in the trial was a blend of 75% polymer III and 25% polymer I, and the anionic activator was sodium disilicate.

TABLE I

| Property | Independent Feed | Sequential pre-mixing Feed |
|----------|------------------|----------------------------|
| Cationic Polymer feed rate | 21 gallons/day | 11.1 gallons/day |

TABLE I-continued

| Property | Independent Feed | Sequential pre-mixing Feed |
|---|---|---|
| Anionic Activator feed rate | 40 gallons/day | 22.3 gallons/day |
| Water Quality | Suspended solids 100 to 900 ppm | Suspended solids consistently <100 ppm |
| 2K Paint | Paint chips prevalent very difficult to process | No chips have been observed |
| Kill | Kill good to very good (some sticky paint) | Good to excellent (some sticky primarily red) |
| Flotation (pit and skimmer) | Good to fair on pit; fair in skimmer | Very good to excellent pit; very good in skimmer; flotation polymer usage cut by 70% over 2 product feed |
| Reduced Sludge Equip Maintenance/ | Equipment cleaned approx. 6 times per yr. | Estimated cleaning frequency reduced to 2 times/year |

While the present invention has been described with respect to particular embodiments thereof, it's apparent that numerous other forms and modifications of the invention will be obvious to those skilled in the art. The appended claims and this invention generally should be construed to cover all such obvious forms and modifications which are within the true spirit and scope of the present invention.

We claim:

1. A process for detackifying and coagulating paint, lacquer, or enamel in spray booths in which water is used to wash air in said booth and to remove oversprayed paints, enamels or lacquers comprising adding to said water a effective amount of a treatment stream formed by intimately mixing a water soluble or water dispersible cationic polymer selected from the group consisting of polydially dimethyl ammonium chloride, a condensation product of dimethylamine plus epichlorohydrin plus ethylene diamine and a condesation product of dimethylamine plus epichlorohydrin in an aqueous stream to form a cationic polymer stream, and thereafter, in sequence adding to said cationic polymer stream an anionic activator selected from the group consisting of metasilicate, orthosilicate, disilicate, mixed silicate, metaaluminate, aluminsilicate, molybdate, phosphomolybdate and phosphate or the sodium, potassium or ammonium salts thereof wherein the weight ratio of anionic activator to cationic polymer is between 0.25 to 10 and 10 to 1 and intimately mixing said anionic activator with said cationic polymer stream on line during said process to detackify and coagulate said paint, lacquer, or enamel in said water.

* * * * *